L. H. PARSONS.
Drafting Plotters.
No. 8,398.
Patented Sept. 30, 1851.
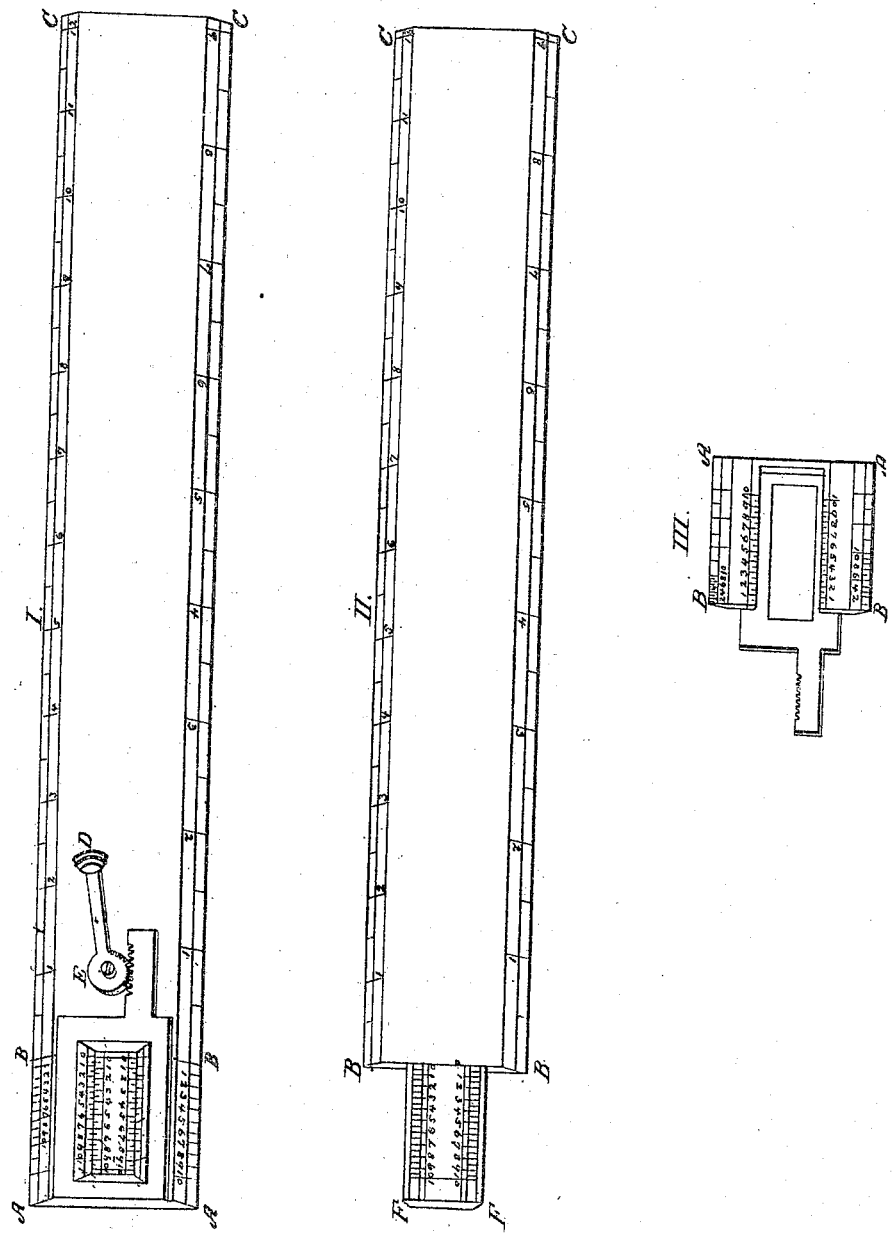

UNITED STATES PATENT OFFICE.

LEMUEL H. PARSONS, OF LAMBERTVILLE, NEW JERSEY.

PLOTTING-SCALE.

Specification of Letters Patent No. 8,398, dated September 30, 1851.

*To all whom it may concern:*

Be it known that I, LEMUEL H. PARSONS, of the town of Lambertville, in the county of Hunterdon and State of New Jersey, have invented a new and useful Improvement in Mathematical Plotting-Scales, which improved instrument, I call the "Vernier Sliding Scales;" and I do declare that the following is a full, clear, and exact description of the construction and operation of the same, reference being had to the annexed drawings, making a part of this specification, in which—

Figure 1, is a perspective view of the whole instrument; Fig. 2, is the main plate of the scale, with one end fitted to receive a vernier slide; the units of measure being divided or graduated on its edges; and Fig. 3, is the vernier slide, fitted to and sliding upon the end of the plate represented at Fig. 2; but appearing with the opposite or under side up; and a single unit of the proper scale on each side of each outer edge, being divided into ten equal parts, or tenths, with a vernier or verniers on each inner edge, so adapted to corresponding lines or marks on the several corresponding parts of the main plate, as that being moved or drawn out upon it, by a lever or otherwise, to any distance not exceeding a tenth part of any given unit of the scale, it will indicate any required number of hundredths or smaller subdivisions of that unit.

The instrument may be made either wholly of metal, of any suitable kind, or mainly of wood, or ivory, with the smaller parts of metal. And it may be made with a single slide and vernier, on one edge, near one end, in which case, there may be two different scales, or units of measure, one on the upper, and one on the underside; or it may be made with a double slide and vernier, at one end of the instrument, in which case there may be four different scales or units of measure, one on each side of each edge, at one end; or it may be made with two double slides and verniers, one at each end of the instrument, in which case there may be eight different scales or units of measure, one on each side of each edge, at each end of the instrument.

The instrument represented in the drawings, and which it is supposed will generally be found a convenient and desirable form of construction, has one double slide, with four scales, or units of measure, one of one inch, one of three-fourths of an inch, one of one-half an inch, and one of one-fourth of an inch; each unit being divided into tenths, on the edge of the slide, and subdivided by the vernier, two of them into hundredths, and two of them into half hundredths. But any other than those scales can be used with equal convenience, and any other than decimal divisions may be adopted if desirable. The vernier slide A B is fitted to the end of the main plate B C, so as to be confined to and movable upon it, by giving to the contiguous parts, a beveled or dove-tail shape, as seen at F, Fig. 2, and at B, Fig. 3. But the slide may be confined to the main plate by other means.

To communicate motion to the slide, with the requisite minuteness and precision, I use the double lever D, E, (the vertical milled head D, acting as one lever) with rack and pinion at E. It may however be worked (though with less celerity, and with scarcely greater precision) by a slow motion screw, or it may be moved without either lever or screw, by pressing the hand directly against the slide. The graduation, or the mark from which the required measurements are applied to paper, as already stated, are on the edges of the instrument; the zero point from which both units and tenths are numbered being at the joint B.

The object and the effect of attaching a slide, carrying with it the primary divisions of the unit, to the scale or rule graduated upon the edge, is to multiply, beyond what is possible with such scale without the slide, the subdivisions, without increasing the difficulty of reading or applying them in practice. This it does as many times as there are divisions on the vernier. Of these divisions there may always be, without difficulty, at least twenty, that subdividing the unit to half-hundredths, however small that unit may be, provided it be not too small for distinguishing the primary divisions on the edge.

This instrument is used, by first moving along the slide A B, (thereby opening the joint B) until the vernier indicates the required number of hundredths, or other subdivisions, and then laying upon the line to which the measure is to be applied, the edge of the instrument, with that side up, containing the desired scale, or unit of measure, and marking therefrom, with a sharp pointed pencil or other instrument, the required number of units and tenths, or tens of hundredths,—the units from the main plate B C, at the point indicated by the proper numeral figure, and the tenths, or tens of hundredths from the slide A B, at the proper figure;—the additional or intermediate hundredths being embraced with them by the opening or extension of the slide. Suppose it be required, for example, to lay down three chains and eighty-seven links, on a scale of one chain to a unit, or thirty-eight chains and seventy links, on a scale of ten chains to a unit,—that is, three units and eighty-seven hundredths: The vernier of the scale used, is first adjusted to the seven hundredths; the third unit mark on the main plate, is then brought to the point on the paper from which the measure is to proceed, and a mark made at the eighth division of the slide A B; thus making three inches (or other units) and eighty-seven hundredths. If any other number of units or tenths, or both, are required, the hundredths, or second decimal figure, remaining the same, as for instance, six units and fifty-seven hundredths, no other or different adjustment of the scale is required;—the sixth unit mark on the main plate, and the fifth division on the slide, being the ones to be used, instead of those before mentioned. If a given line, or the distance between two given points, is to be measured, instead of a given measure to be applied to the line, the scale is placed so that some part of the vernier slide shall fall upon one of them, while the nearest unit mark is brought exactly upon the other. The slide is then moved (the rest of the instrument remaining unmoved) till the nearest tenth mark strikes the given point. The number of the unit and tenth marks must then be observed before removing the scale from the paper; but the vernier or hundredth mark may be read off afterwards.

What I claim to be my invention, and desire to secure by Letters Patent, is not the division into equal parts, with or without subdivisions of one or more of those parts, of the continuous edge of a scale or rule; nor the use of a vernier for measuring or describing right lines;—nor the manner of attaching the vernier slide to the main plate of the instrument, nor the use of a lever or slow motion screw for adjusting the motions of the vernier slide; but

The combined application, in one and the same instrument, of the graduation upon the edge, (to obviate the imperfection and inconvenience attending the use of dividers or compasses,) and the slide, carrying with it the several primary divisions of the unit, and those divisions carrying with them respectively, by means of the vernier, the several secondary divisions into hundredths or otherwise, so as to enable the operator to distinguish and apply hundredths or half hundredths of the smallest unit, with as great rapidity, precision and ease, as tenths of the same unit, with the scale graduated on the edge without a slide; and so likewise that whatever parts of a unit are required, or whatever the whole length of line to be measured, the whole amount of motion required, in lengthening or shortening the instrument, is only equal to the number of additional or intermediate hundredths or other subdivisions, never exceeding one tenth of the unit of measure.

LEMUEL H. PARSONS.

Witnesses:
J. H. WAKEFIELD,
ASHBEL WELCH.